June 7, 1949.                A. J. HARRISON                2,472,530
                            PIPE COUPLING TOOL
                          Filed Dec. 23, 1947
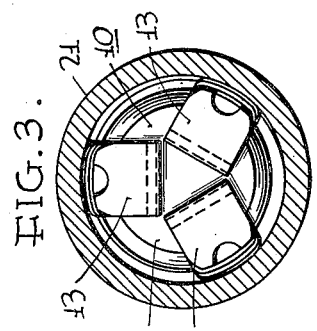
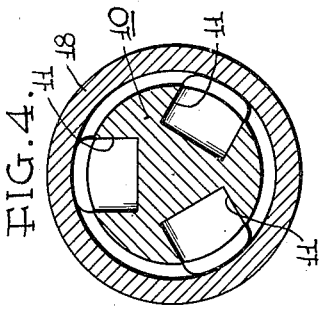
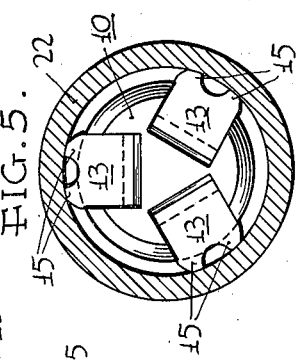
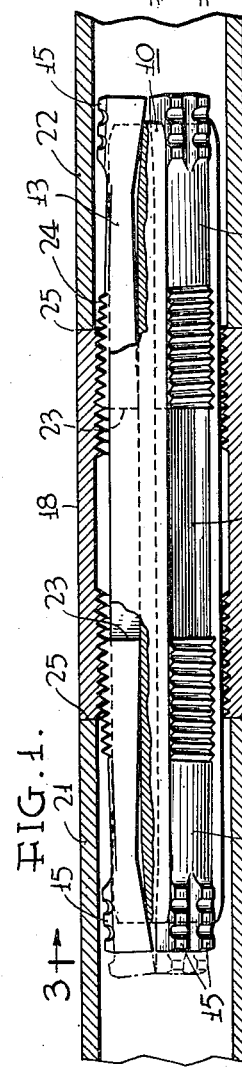
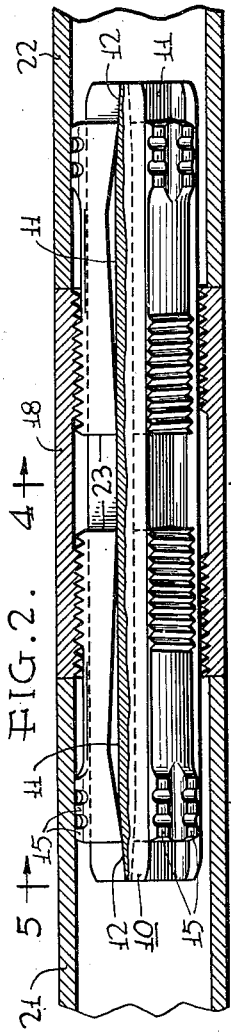
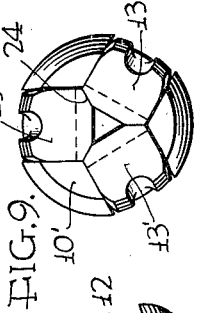
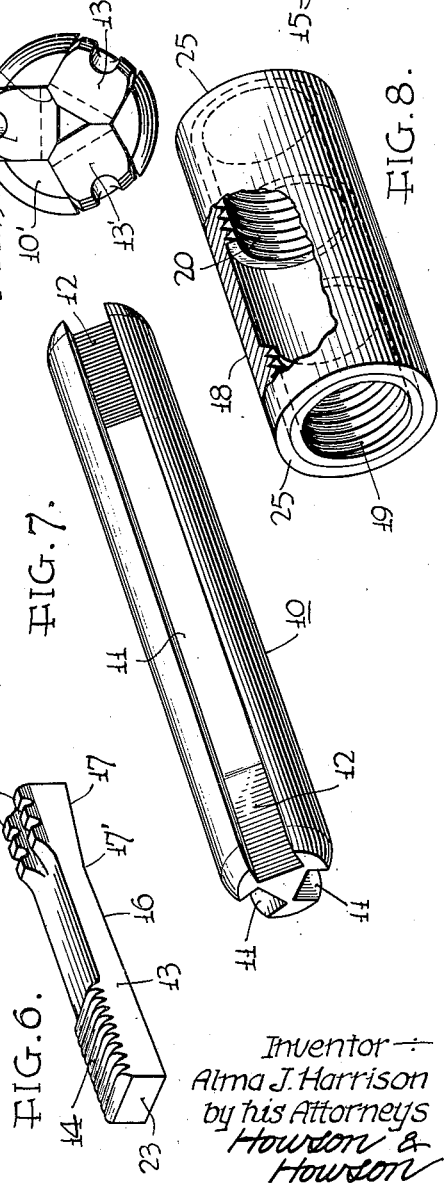
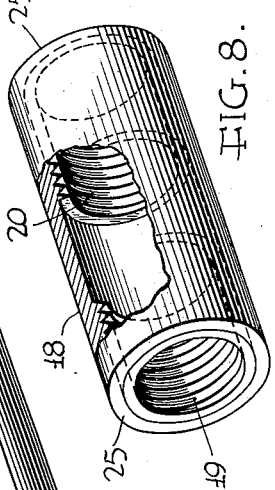
Inventor —
Alma J. Harrison
by his Attorneys
Howson &
Howson Patented June 7, 1949

2,472,530

UNITED STATES PATENT OFFICE 2,472,530

PIPE COUPLING TOOL

Alma J. Harrison, Philadelphia, Pa., assignor to Proctor & Schwartz, Inc., Philadelphia, Pa., a corporation of Pennsylvania Application December 23, 1947, Serial No. 793,426

10 Claims. (Cl. 285—1)

This invention relates to couplings and more particularly to a coupling adapted to connect unthreaded lengths of pipe or tubing internally.

In the process of winding fins on tubing or pipe, it is necessary that the pipe be fed axially through the winding machine and in order that this may be as nearly a continuous operation as possible, it is important that the lengths of pipe be fed one after the other and connected for the feeding operation end-to-end.

The pipe is driven through the winding machine by means of rolls in advance of the winding head and it is therefore essential, in order to wind the fin nearly to the end of the pipe sections, that the pipe coupling element be able to pass through the rolls as well as the winding head itself. Furthermore, it is important that there be no axial or rotational movement between the coupled pipe sections.

It has been found in practice that commercial pipe sections have considerable variation in their internal diameter. Therefore, the coupling must be capable of securely grasping the sections despite such variations in the bore.

The primary object therefore of the invention, is to provide a coupling or coupling tool of the class described, which has no projection greater than the outside diameter of the pipe sections.

A further object of the invention is to provide an internal coupling having an oppositely threaded collar whereby the coupling may be readily tightened and removed from the unthreaded bore of the pipe sections.

A still further object of the invention is to provide an internal coupling for pipe sections having variations in bore.

A still further object is to provide an internal coupling adapted to grasp pipe sections having different opposite bores.

Further objects of the invention will be apparent from the specification and drawings in which:

Fig. 1 is a sectional view showing a coupling constructed in accordance with the invention, installed in two lengths of pipe before tightening;

Fig. 2 is a view similar to Fig. 1 but with the jaws of the coupling in a clamped or expanded position;

Fig. 3 is a section taken along the line 3—3 of Fig. 1;

Fig. 4 is a section taken along the line 4—4 of Fig. 2;

Fig. 5 is a section taken along the line 5—5 of Fig. 2;

Fig. 6 is a perspective of one of the jaws of the coupling;

Fig. 7 is a perspective of the coupling mandrel;

Fig. 8 is a perspective partly broken away of the coupling collar; and

Fig. 9 is a view similar to Fig. 3 but with the collar removed, showing a slightly modified form of jaw construction.

The invention comprises essentially the provision of a grooved mandrel substantially less in diameter than the bore of the pipe in which the coupling is to be used. In one form, the mandrel has three axial grooves or splines which are radially and inwardly tapered at their extremities. Six jaws, each having outwardly disposed teeth on one end and threaded portions at the other end, are mounted in the mandrel splines. The threads on the jaws at one end are right-hand, while the threads on the three jaws at the opposite end are left-hand. A threaded collar having the same outside diameter as the pipe sections, centrally encloses the mandrel and engages the threaded portions of the jaws. The collars has cooperating right and left-hand internal threads so that when the collar is rotated with respect to the mandrel, each set of jaws is moved axially in the splines either towards or away from the other set, depending upon the direction of rotation.

Each jaw has a wedge section opposite the teeth adapted to cooperate with the cut-away or beveled portion of the spline so that when the jaws are axially retracted into the collar to a position in which the wedge portion on the jaws engages the spline bevel, they are forced radially outward to expand against the bore of the pipe sections. The construction of the coupling, especially the mandrel, is such that the set of jaws at one end is capable of expanding and contracting either in unison with, or independently of, the set of jaws at the opposite end so that not only will the coupling accommodate pipe sections in which one pair of equal pipe bores to be coupled together varies with respect to a succeeding pair of equal bores, but also in which the variations may be between unequal bores which are to be coupled end-to-end.

Referring now more particularly to the drawings, the mandrel 10 has in the preferred embodiment, three axial splines 11 which are cut radially at 120° angles. The extremity of each spline may be tapered as at 12 to provide, in effect, a gradually beveled base for the splines 11.

Hardened steel jaws 13 slide axially in the splines and have a free-running fit between the walls thereof. The outer surface of each jaw is provided with a threaded portion 14 at one end and a series of teeth 15 at the opposite end. The bottom face of each jaw is of a concave configuration comprising a flat portion 16 underneath threads 14 and slightly biased with respect to the top surface of the jaw together with a more sharply tapered or biased flat portion 17 underneath teeth 15. These biased faces 16 and 17 form a doubled wedge base having an apex at 17' opposite the inner terminus of teeth 15, as shown clearly in Figs. 1 and 6.

Axial movement of all the jaws in the splines is achieved by means of a collar 18 positioned centrally on mandrel 10. The collar has opposite internal threads 19 and 20 at each end which engage the threaded portions 14 on the jaws. The outside diameter of collar 18 is the same as the outside diameter of the pipe sections 21 and 22 so that a smooth joint is provided when the jaws are tightened.

The jaws 13 in effect pivot radially at their innermost ends 23 and in order to provide sufficient relief for this pivoting, the under surface 16 of each jaw tapers upwardly to a point just in back of the teeth 15 as described above. The thickness of the jaws at the inner extremities is such that the last few threads 14 of the jaws always remain in substantially complete engagement with the internal threads 19 and 20 on collar 18. However, it will be apparent that the last few outer threads 14 may, in the maximum retracted position of Fig. 9, become partially or completely disengaged from the threads on the collar. In the fully expanded position however, it is necessary that the threads on the jaws not bind in the collar threads until the teeth 15 contact the bore of the pipe section. For this reason, the threads may be tapered slightly at 24 as shown in Fig. 1 to permit maximum radial expansion.

In operation, collar 18 is rotated with respect to mandrel 10 to move the jaws 13 axially towards the extremities of the mandrel. This permits the wedge portions 17 to extend beyond the beveled portions 12 of the mandrel. In this position, the teeth 15 are sufficiently retracted to permit ready insertion of the coupling into the bore of a pipe section. Since the jaws 13 are threaded approximately equal distances in collar 18, the set of jaws at the opposite end of the coupling assumes the same radial position as the jaws on the other end when the mandrel is normally centered with respect to the collar. The opposite jaws are then inserted into the other pipe section until the end of the pipe abuts the face 25 on collar 18. In this position, both pipe sections 21 and 22 are non-rotatably held by the winding machine rolls and/or pipe wrenches, whereupon collar 18 is rotated with a pipe wrench to draw each set of jaws axially towards the other set. As wedge portions 17 of the jaws contact the bevels 12, the outer ends of the jaws are automatically expanded radially until teeth 15 engage the bore of both pipe sections as shown in Fig. 2. In this manner, the pipe sections are securely fastened to each other in accurate alignment and may be fed into the winding machine without presenting any obstruction to the rolls or winding head during the feeding process. The machine is then stopped before the fin is wound on collar 18, whereupon the fin is severed, the coupling removed and inserted in the opposite end of the trailing pipe section.

Since it has been found in practice that the bore of pipe or tubing used in the finning operation varies considerably, I have provided a coupling which is capable of accommodating the variations found in commercial pipe sections. In the event that pipe section 22 for example, has an unusually small bore as compared to the bore of section 21, mandrel 10 is capable of moving axially with respect to the collar 18 and jaws 13 so that when the set of jaws in section 22 grips the bore, the collar 18 may be further turned to slide mandrel 10 axially until the jaws in section 21 expand sufficiently to engage the inner wall of the larger section. In addition, the outside diameter of mandrel 10 is such that it may be inserted within the smallest pipe sections which may be encountered. By chamfering the corners of the jaws at 26 (Fig. 9), they may be retracted until teeth 15 are within the diameter of the mandrel. In this way, a pipe section having merely a sliding fit over the mandrel may be securely clamped when the jaws are expanded.

It will be understood that the number of splines in mandrel 10 may be varied and also the bevels in the splines may be eliminated if desired, but I have found that the preferred form shown herein gives a more satisfactory and smoother gripping action.

I have therefore provided a coupler for pipe and tube which eliminates the necessity of all threads on the pipe sections and which securely grasps the bore of succeeding sections to maintain them in rigid axial alignment.

Having thus described the invention, I claim:

1. A coupling for pipe sections and the like, comprising a splined mandrel having a diameter less than the bore of the pipe sections which are to be coupled, a plurality of jaws axially movable in the splines of said mandrel, a set of jaws positioned in opposite ends of each spline, opposite external threads at the inner extremities of each jaw, teeth at the outer external extremities of each jaw, a collar mounted on the mandrel and having an outside diameter substantially equal to that of the pipe section to be coupled, and internal opposite threads in the collar adapted to enclose the mandrel and engage the threads on the jaws whereby the jaws are moved axially in the splines when the collar is rotated with respect to the mandrel.

2. A coupling in accordance with claim 1, in which the splines in the mandrel are beveled at their extremities.

3. A coupling in accordance with claim 1, in which the spline engaging bottoms of the jaws are wedge shaped.

4. A coupling in accordance with claim 1, in which the threaded portions of the jaws are tapered to permit pivotal movement of the jaws with respect to the mandrel and the collar.

5. A coupling in accordance with claim 1, in which the last few threads on the jaws retain substantially full engagement with the internal collar threads, the base of the jaw opposite the first few threads serving as a pivot for the jaw and the base of the jaw being relieved to permit radial contractile pivoting of the jaws.

6. A coupling for internally attaching pipe sections and the like, comprising a mandrel having three axial splines set at 120°, the splines being beveled at each extremity of the mandrel; three jaws adapted to slide axially in the splines at one end of the mandrel, said jaws having external right-hand threaded portions near their inner extremities, external teeth near their outer extremities and a wedge-shaped base surface opposite the teeth; three jaws adapted to slide axially in the opposite ends of the splines, said second three jaws having external left-hand threaded portions near their inner extremities, external teeth near their outer extremities and a wedge-shaped base surface opposite the teeth; and a collar adapted to have relative axial and rotational movement with respect to the mandrel, said collar having internal right and left-hand threads for engagement with the external threads on the jaws.

7. A coupling in accordance with claim 6, in which the bases of the jaws are relieved to permit radial pivoting action in the splines.

8. A coupling in accordance with claim 6 in which the teeth on the jaws may be retracted to at least the same diameter as the mandrel and in which the teeth are axially spaced from the jaw threads.

9. A coupling in accordance with claim 6 in which the wedge shaped base surface is formed of a double wedge which tapers gradually with increasing thickness towards each extremity of the jaw.

10. A coupling for pipe sections and the like comprising a splined mandrel having a diameter less than the bore of the pipe sections which are to be coupled, a plurality of jaws movable in the splines of said mandrel, said jaws being positioned within the mandrel to engage the bore of each pipe section to prevent relative rotational and axial movement of the sections, a collar mounted on the mandrel having an outside diameter substantially equal to that of the pipe sections, and means operable to connect the collar and the jaws to expand the jaws against the bore of the pipe sections when the collar is rotated with respect to the mandrel.

ALMA J. HARRISON.

No references cited.